United States Patent [19]

Lee

[11] Patent Number: 5,623,318
[45] Date of Patent: Apr. 22, 1997

[54] GHOST CANCELLING METHOD AND APPARATUS USING CANONICAL SIGNED DIGIT CODES

[75] Inventor: Myeong-hwan Lee, Suwon, Rep. of Korea

[73] Assignee: Samsung Electronics Co., Ltd., Kyungki-do, Rep. of Korea

[21] Appl. No.: 528,652

[22] Filed: Sep. 7, 1995

[30] Foreign Application Priority Data

Sep. 7, 1994 [KR] Rep. of Korea .................. 94-22512

[51] Int. Cl.$^6$ ............................................ H04N 5/213
[52] U.S. Cl. ............................................... 348/614
[58] Field of Search ................................ 348/614, 607, 348/914, 611; 358/167, 36, 905; 375/231, 348, 350; H04N 5/213, 5/21

[56] References Cited

U.S. PATENT DOCUMENTS

| | | | |
|---|---|---|---|
| 4,953,026 | 8/1990 | Kobayashi | 348/614 |
| 5,361,102 | 11/1994 | Roy | 348/614 |
| 5,389,977 | 2/1995 | Lee | 348/614 |

OTHER PUBLICATIONS

A Tutorial On Ghost Cancelling In Television Systems (IEEE Transactions On Consumer Electronics, vol. CE-25, pp. 9-44, Feb., 1979, by W. Ciciora, G. Sgrignoli and W. Thomas).

Training Signal and Receiver Design For Multi-Path Chanel Characterization For TV Broadcasting (IEEE Transactions On Consumer Electronics, vol. 36, No. 4, pp. 794-806, Nov., 1990, by J.D. Wang, T.H.S. Chao and B.R. Saltberg).

Development Of A Ghost Cancel Technology For TV Broadcasting (1990 NAB Engineering Conference Proceedings, pp. 229-238, 1990, by Shigeo Matsuura et al).

Ghost Cancelling: A New Standard for NTSC Broadcast Television ((IEEE Transactions on Broadcasting, vol. 38, No. 4, pp. 224-228, Dec. 1992, by Lynn D. Claudy and Stephen Herman).

Signed Digit No. Representation for Fast Parallel Arithmetic (IRE Transactions On Electronic Computers, vol. EC-10, pp. 383-400, Sep., 1961, by Algirdas Avizenis).

An Improved Search Algorithm For The Design Of Multiplierless FIR Filter With Power-of-two Coefficients (IEEE Transactions On Circuit And Systems, vol. 36, No. 7, pp. 1044-1047, Jul., 1989).

Primary Examiner—Sherrie Hsia
Attorney, Agent, or Firm—Sughrue, Mion, Zinn, Macpeak & Seas

[57] ABSTRACT

A ghost canceler uses a filter coefficient represented in canonical signed digit code to cancel a ghost of a video signal. The ghost cancelling apparatus includes an input end for receiving a ghost-containing video signal, a separation and storage portion for separating a transmitted ghost cancelling reference (GCR) signal from the video signal received via the input end, and storing the separated GCR signal therein, a controller for receiving the GCR signal stored in the separation and storage portion to detect a characteristic of a channel through which the video signal is transmitted, and generating canonical signed digit (CSD) filter coefficient values represented in the form of CSD codes on the basis of the detected channel characteristic, and a filter for cancelling a ghost component contained in the video signal received via the input end on the basis of the CSD filter coefficient values generated by the controller, and outputting the ghost-cancelled video signal. This arrangement allows a smaller amount of hardware to be used than in an existing ghost canceler while providing similar ghost cancelling performance.

15 Claims, 6 Drawing Sheets

GHOST CANCELLING METHOD AND APPARATUS USING CANONICAL SIGNED DIGIT CODES

BACKGROUND OF THE INVENTION

The present invention relates to a ghost cancelling method and apparatus using canonical signed digit codes, and more particularly to a ghost cancelling method and apparatus capable of cancelling ghosts which exist in a television broadcast signal on the basis of filter coefficients converted into canonical signed digit codes.

A ghost phenomenon or a multipath distortion is due to a result of a multipath channel which occurs due to the reflectance of radio waves by mountains, buildings or airplanes. The ghosts are displayed on a television receiver set as different patterns of video signals superimposed on an image of an original signal and having delay and attenuation characteristics with respect to the original image signal. The ghost also distorts a frequency characteristic of the television signal. There have been various approaches for reducing ghosts since the ghost phenomenon significantly lowers the picture quality of an image displayed on the television receiver set. These approaches are disclosed in the following references: [1] "A Tutorial On Ghost Cancelling In Television Systems" (IEEE Transactions On Consumer Electronics, Vol. CE-25, pp. 9–44, February 1979, by W. Ciciora, G. Sgrignoli and W. Thomas); [2] "Training Signal And Recursive Design For Multi-path Channel Characterization For TV Broadcasting" (IEEE Transactions On Consumer Electronics, Vol. 36, No. 4, pp. 794–806, November 1990, by J. D. Wang, T. H. S. Chao and B. R. Saltberg); [3] "Development Of A Ghost Cancel Technology For TV Broadcasting" (1990 NAB Engineering Conference Proceedings, pp. 229–238, 1990, by Shigeo Matsuura et al); and [4] "Ghost Cancelling: A New Standard For NTSC Broadcast Television" (IEEE Transactions On Broadcasting, Vol. 38, No. 4, pp. 224–228, December 1992, by Lynn. D. Claudy and Stephen Herman).

The above reference [3] proposed a system for automatically cancelling ghosts using a waveform equalization technology. According to reference [3], a transmitter inserts a ghost cancelling reference (GCR) signal in a vertical blanking period of a video signal and transmits the result, so that a receiver can effectively cancel the ghosts. The reference [4] a standard GCR signal which is used in the United States in order to cancel ghosts. A reference [5] relating to the standard Korean GCR signal is entitled "Reference Signals For Ghost Cancelling In Television" (ITU-R Document 11C/46-E).

Most ghost cancelers use a number of transversal filters to reduce ghosts. A general transversal filter for cancelling ghosts should have a number of taps and multipliers for filtering a video signal of one horizontal scan line period. This requires a large-sized chip and raises a problem of large power consumption. Thus, this arrangement is disadvantageous in that it is difficult to implement in a single chip a transversal filter for cancelling ghosts.

U.S. Pat. No. 4,953,026 to Reiichi Kobayashi et al. entitled "Video Ghost Signal Cancelling Circuit Having Variable Delay Lines" discloses a method for reducing the number of taps of filters to implement a transversal filter into a single chip. Actually, as in the above U.S. Pat. No. 4,953,026, variable delays are used to form a filter having a low number of taps, to thereby reduce the hardware complexity of a filter. However, since multipliers constituting such a filter still occupy a large space and have large power requirements, it is desirable to simply implement such multipliers.

SUMMARY OF TEE INVENTION

Therefore, to solve the above problems, it is a first object of the present invention to provide a ghost cancelling method capable of cancelling ghosts contained in a video signal by using filter coefficients represented in the form of canonical signed digit codes.

A second object of the present invention is to provide a ghost cancelling apparatus capable of cancelling ghosts contained in a video signal using only a small amount of hardware by using filter coefficients represented in the form of canonical signed digit codes.

To accomplish the first object of the present invention, there is provided a ghost cancelling apparatus comprising:

an input end for receiving a ghost-containing video signal;

means for separating a transmitted ghost cancelling reference (GCR) signal from the video signal received via the input end, and storing the separated transmitted GCR signal therein;

control means for receiving the transmitted GCR signal stored in the separation and storage means to detect a characteristic of a channel through which the video signal is transmitted, and generating canonical signed digit (CSD) filter coefficient values represented in the form of CSD codes on the basis of the detected channel characteristic; and filter means for cancelling a ghost component contained in the video signal received via the input end on the basis of the CSD filter coefficient values generated by the control means, and outputting the ghost-cancelled video signal.

The second object of the present invention can be accomplished by providing a ghost cancelling method for cancelling a ghost-containing received video signal, the ghost cancelling method comprising the steps of:

(a) storing canonical signed digit (CSD) filter coefficient values represented in the form of CSD codes in correspondence to respective actual filter coefficient values, and a standard ghost cancelling reference (GCR) signal;

(b) separating a transmitted GCR signal from the ghost-containing received video signal and storing the separated transmitted GCR signal;

(c) reading the stored transmitted GCR signal and the stored standard GCR signal;

(d) using two GCR signals read in the step (c), detecting a characteristic of a channel through which the ghost-containing video signal is transmitted, and performing a ghost cancelling operation with respect to the transmitted GCR signal according to the detected channel characteristic, to thereby determine optimum CSD filter coefficient values with respect to the detected channel characteristic; and (e) performing a ghost cancelling operation with respect to the received ghost-containing video signal on the basis of the determined optimum CSD filter coefficient values.

BRIEF DESCRIPTION OF TEE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings FIGS. 1 through 7.

One method for reducing the complexity of a filter by simply constituting multipliers uses filter coefficients represented in CSD codes. The filter coefficients represented in the CSD codes are disclosed in references entitled: [6] "Signed Digit Number Representation For Fast Parallel Arithmetic" (IRE Transactions On Electronic Computers, Vol. EC-10, pp. 383–400, September 1961, by Algirdas Avizenis); and [7] "An Improved Search Algorithm For The Design Of Multiplierless FIR Filter With Powers-of-two Coefficients" (IEEE Transactions On Circuit And Systems, Vol. 36, No. 7, pp. 1044–1047, July 1989, by Henry Samueli). In the theorem of the CSD codes relating to the above references [6] and [7], a value of "1" or "−1" is assigned to coefficient values of the fixed digits, respectively, and a value of "0" is assigned to the other coefficient values, respectively. In other words, radix-2 signed-digit representation of fraction "X" has a general form as follows.

$$X = \sum_{k=1}^{L} S_k 2^{-P_k}$$

Here, $S_k$ having a k-th digit satisfies a condition $S_k \in \{-1, 0, 1\}$, $P_k$ having a k-th digit satisfies a condition $S_k \in \{0, 1, 2, \ldots, M-1\}$, where M indicates the total number of digits, and L indicates the number of non-zero coefficients. The CSD representation is defined as a minimum representation in which two nonzero coefficients $S_k$ are not adjacent to each other. The merit of the CSD code in comparison with the general radix-2 signed digit code is that most of the digits can be represented as a small number of nonzero digits due to flexibility supplemented by the negative digits. In case of a filter using filter coefficients represented as the CSD codes (hereinafter referred to as CSD coefficients), multipliers can be easily implemented using "L" shifters and "L−1" adders/subtractors. Thus, the number of adders/subtractors actually required for each multiplier in the filter can be limited to the number L of the non-zero coefficients in the CSD code minus one.

Figure 1:
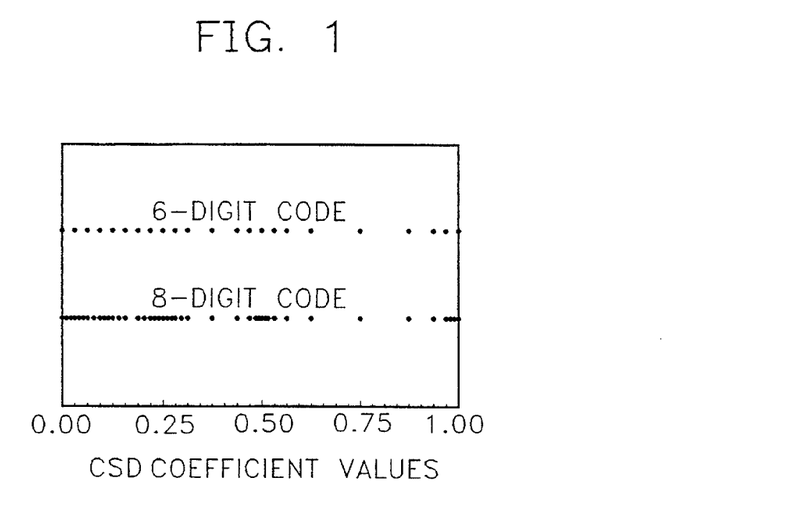
FIG. 1 is a view showing a distribution of canonical signed digit (CSD) coefficients.

FIG. 1 shows the distribution of the CSD codes between "0" and "1" of the respective cases when L=2, M=6 and M=8. As can be seen in FIG. 1, the distribution of the CSD coefficients is considerably irregular and is concentrated into regions having small magnitudes of the CSD coefficient values, respectively.

Since most of the ghost signals are concentrated in the regions having smaller magnitudes thereof, the CSD coefficients having the irregular distribution characteristic can be used as filter coefficients of a ghost cancelling filter. However, since the ghost signal has an extremely small magnitude in comparison with the original video signal, the actual real-number type filter coefficients calculated on the basis of the channel characteristic are not transformed into the CSD coefficients immediately. Instead, in order that the actual filter coefficients may be transformed into the CSD coefficients more effectively, the respective actual filter coefficients are multiplied by a scaling factor larger than "1" and the actual filter coefficients are re-adjusted in size, to then be transformed into the CSD coefficients. By doing so, the actual filter coefficients having relatively large values which exist in a region having a relatively low distribution density of the CSD coefficients, are transformed into those having relatively small values which exist in a region having a relatively high distribution density of the CSD coefficients. It is possible to transform the actual filter coefficients into the CSD coefficients using the scaling factor by region, since the filter gain does not influence the filter frequency characteristic. The scaling factor by which the actual filter coefficients are multiplied is calculated using a ripple of the frequency characteristic as a variable, therefore requiring time consuming calculations to calculate it. Thus, most of the filter technologies using CSD coefficients have been used for filters having fixed channel characteristics.

By the way, since the ghost signals included in the actual video signal differ from each other in size, it is desirable that a respective scaling factor be assigned to each ghost to enhance the ghost cancelling performance. Effectiveness can be increased if more than two scaling factors are used when the ghost is large in size or in a processor such as a waveform equalization filter. For this reason, a greater amount of calculation is required when the number of the scaling factors increases due to the increase of the different sized ghosts, or when the precision of the scaling factors increases. Such a problem of calculating the scaling factors can be solved by a microprocessor having sufficient capability for use in a ghost canceler. However, when the actual filter coefficients are transformed into the CSD coefficients using the scaling factors, the filter gains increase or decrease. Such a gain change problem can be reduced by multiplying the output of a transversal filter by a rescaling factor which is an inverse of the scaling factor. A quantization error generated in transforming an actual filter coefficient into a CSD coefficient can be reduced by a process which uses the scaling factor and the rescaling factor. Thus, it is possible to design a transversal filter capable of cancelling the ghost signals using CSD coefficients. An adaptive filter which adaptively operates according to the channel characteristic is required to apply the actual CSD coefficients to a filter having a variable channel characteristic.

Figure 2:
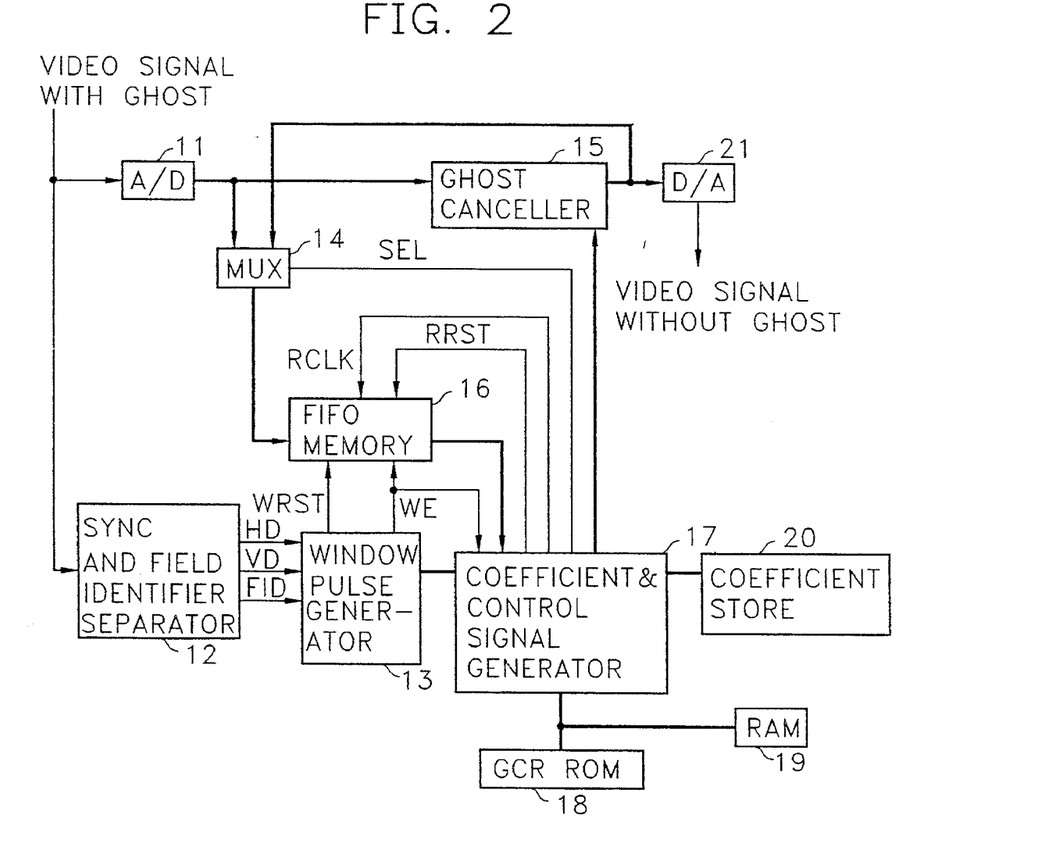
FIG. 2 is a block diagram of a ghost cancelling apparatus using CSD coefficients as filter coefficients according to a preferred embodiment of the present invention.

FIG. 2 is a block diagram of a ghost cancelling apparatus using CSD coefficients as filter coefficients according to a preferred embodiment of the present invention.

The FIG. 2 apparatus uses adaptive CSD coefficients as filter coefficients for filtering the ghost-containing video signal to operate adaptively according to the varied channel characteristic.

A ghost-containing video signal is applied to an analog-to-digital (A/D) converter 11 and a sync and field identifier separator 12. Sync and field identifier separator 12 supplies a horizontal sync signal HD, a vertical sync signal VD, and a field identification signal FID to a window pulse generator 13. Window pulse generator 13 generates a write reset signal WRST and a write window signal WE. Write reset signal WRST and write window signal WE are supplied to a first-in-first-out (FIFO) memory 16.

A coefficient and control signal generator 17 for controlling window pulse generator 13 receives write window signal WE from window pulse generator 13. The coefficient and control signal generator 17 is connected to a GCR ROM 18 for storing a standard GCR signal and to a coefficient store 20 for storing CSD coefficient signal CSC. Coefficient and control signal generator 17 generates read reset signal RRST, a read clock signal RCLK, a select signal SEL, a CSD coefficient signal CSC, a rescaling factor signal RSF, and various control signals for controlling window pulse generator 13 and ghost canceler 15. FIFO memory 16 stores a signal supplied from a multiplexer 14 according to write reset signal WRST and write window signal WE. FIFO memory 16 also outputs the stored data to coefficient and control signal generator 17 according to read reset signal RRST and read clock signal RCLK applied from coefficient and control signal generator 17. On the other hand, the output signal of A/D converter 11 is applied to multiplexer 14 and ghost canceler 15. Multiplexer 14 selectively supplies one of the signals applied according to select signal SEL input from coefficient and control signal generator 17 to FIFO memory 16.

Figure 3:
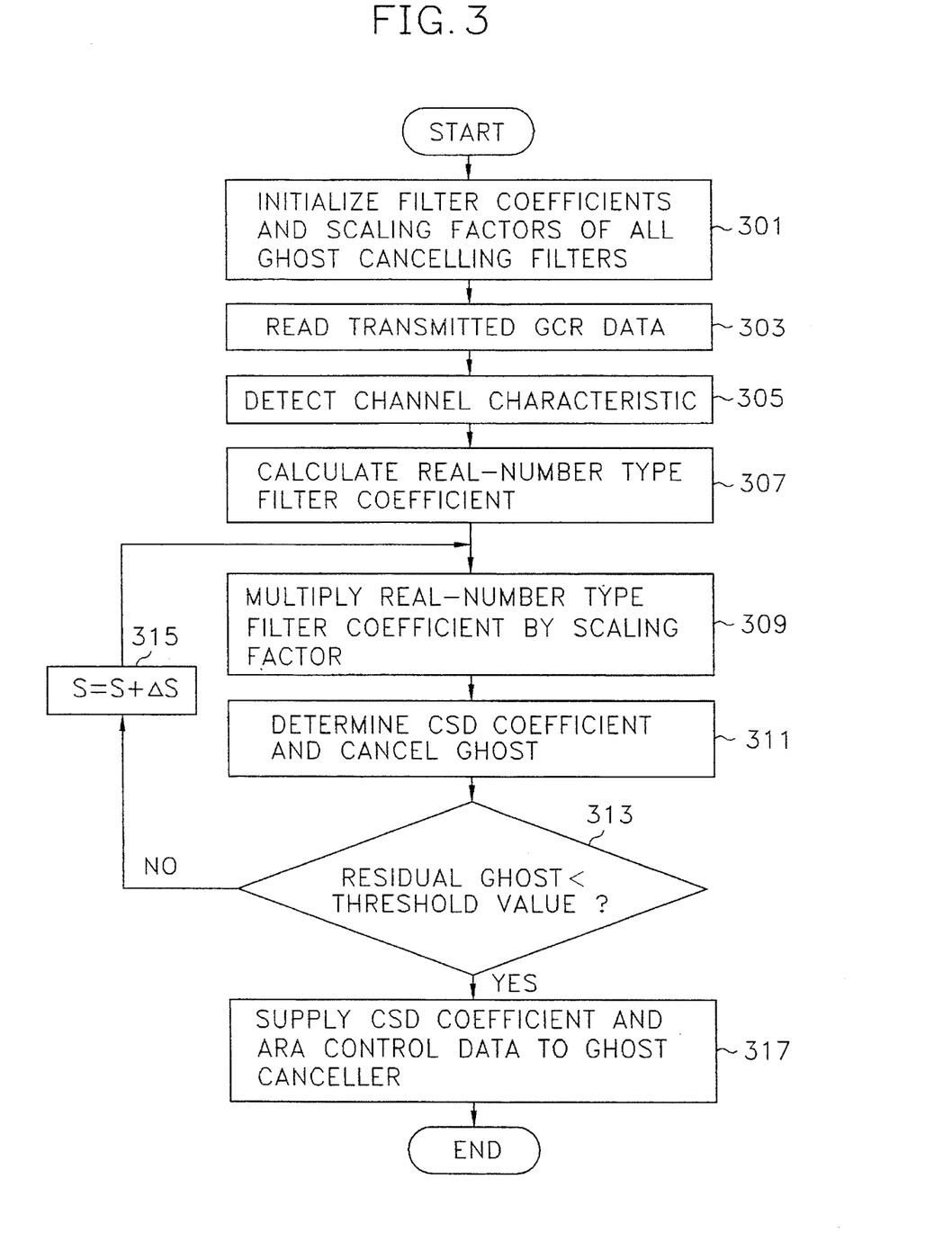
FIGS. 3 and 4 are flow-chart diagrams for explaining an operation of a coefficient and control signal generator shown in FIG. 2, respectively.
Figure 4:
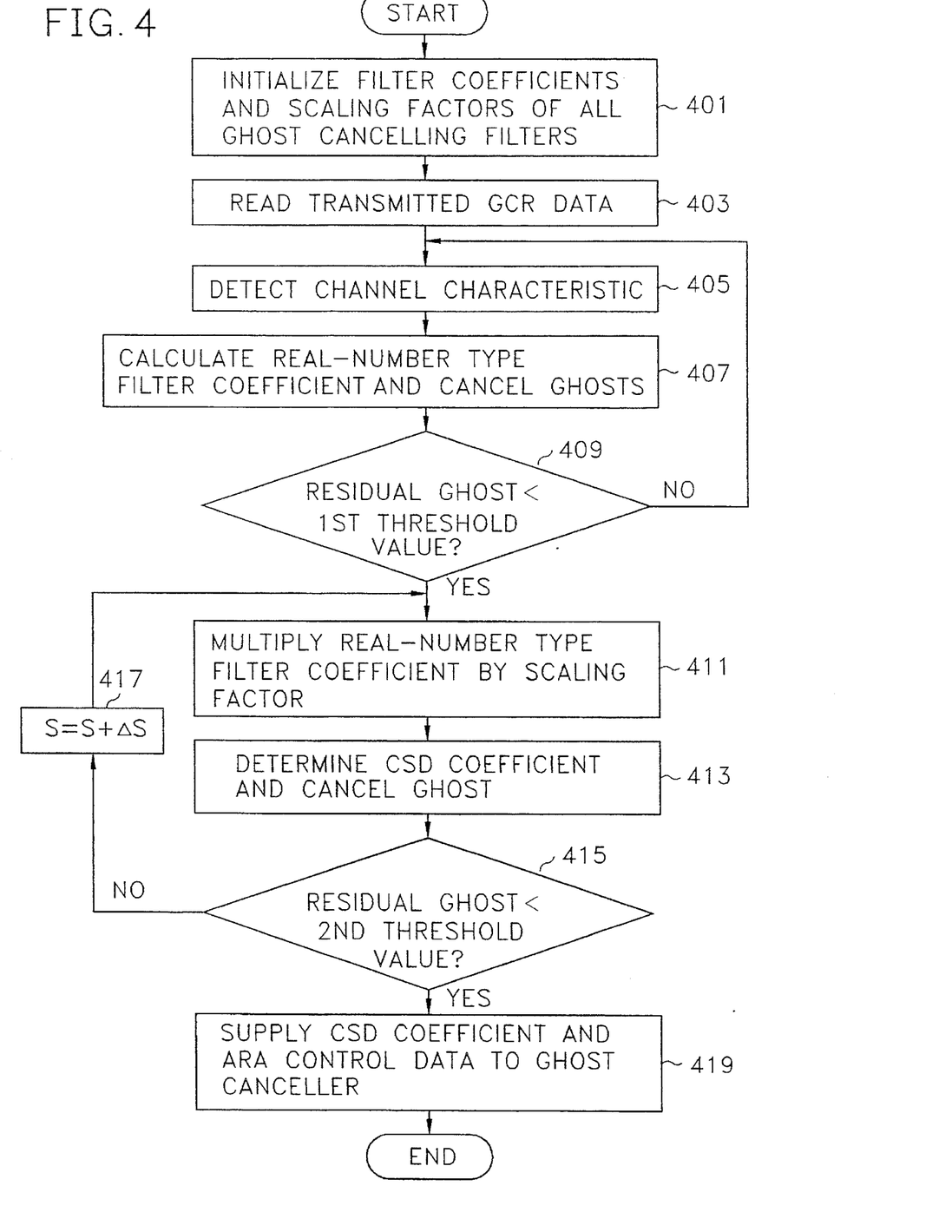

FIGS. 3 and 4 are flow-chart diagrams for explaining a signal processing operation of a coefficient and control signal generator 17 shown in FIG. 2, respectively. Coefficient and control signal generator 17 operates according to the flow-charts of FIGS. 3 and 4 to generate CSD coefficient signal CSC and rescaling factor signal RSF. The signal processing according to the flow-charts of FIGS. 3 and 4 is independently applied to each ghost. An operation of coefficient and control signal generator 17 in FIG. 2 will be described below with reference to FIG. 3.

When the FIG. 2 apparatus starts to operate, coefficient and control signal generator 17 controls ghost canceler 15 to initialize the CSD coefficients which are the filter coefficients of all the filters in ghost canceler 15, and simultaneously initializes scaling factor S into a predetermined initial value in step 301. A/D converter 11 converts the input video signal into a digital ghost-containing video signal and supplies the converted signal to multiplexer 14 and ghost canceler 15. Ghost canceler 15 filters the ghost-containing video signal applied from A/D converter 11, and then supplies the filtered signal to D/A converter 21 and multiplexer 14. Multiplexer 14 supplies the signal input from A/D converter 11 or the signal input from ghost canceler 15 to FIFO memory 16 according to an initial value of select signal SEL established by coefficient and control signal generator 17.

On the other hand, sync and field identifier separator 12 detects vertical sync signal VD, horizontal sync signal HD and field identification signal FID from the ghost-containing video signal and supplies the detected signal to window pulse generator 13. Window pulse generator 13 uses the input signals VD, HD and FID to detect an interval where a transmitted GCR signal is contained in the video signal. Window pulse generator 13 generates write reset signal WRST and write window signal WE corresponding to the detected transmitted GCR signal interval on the basis of the control signals applied from coefficient and control signal generator 17. FIFO memory 16 stores the signal applied from multiplexer 14 according to write reset signal WRST and write window signal WE. In more detail, FIFO memory 16 stores the data within the window interval determined by write window signal WE among the video signal applied via multiplexer 14, that is, the transmitted GCR signal.

Figure 5A:
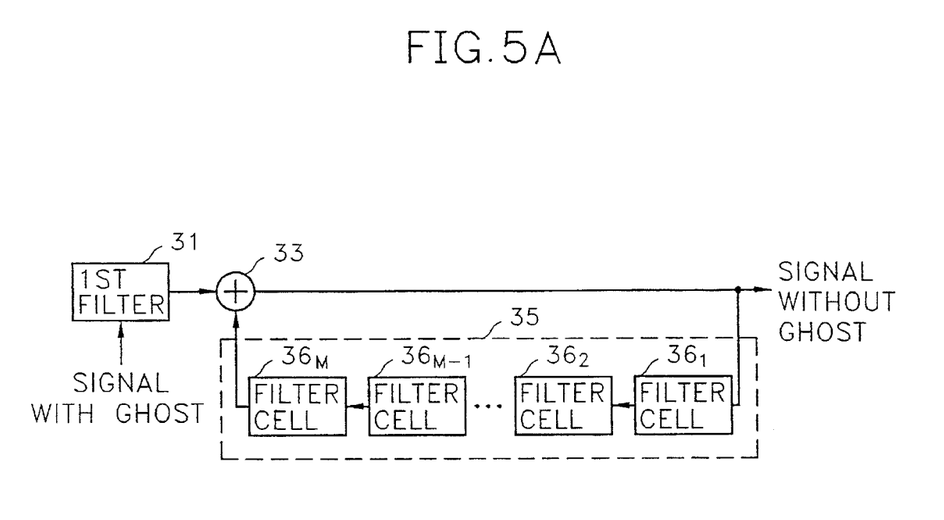
FIGS. 5A and 5B are block diagrams showing two different filter arrangements constituting a ghost canceler of FIG. 2.
Figure 5B:
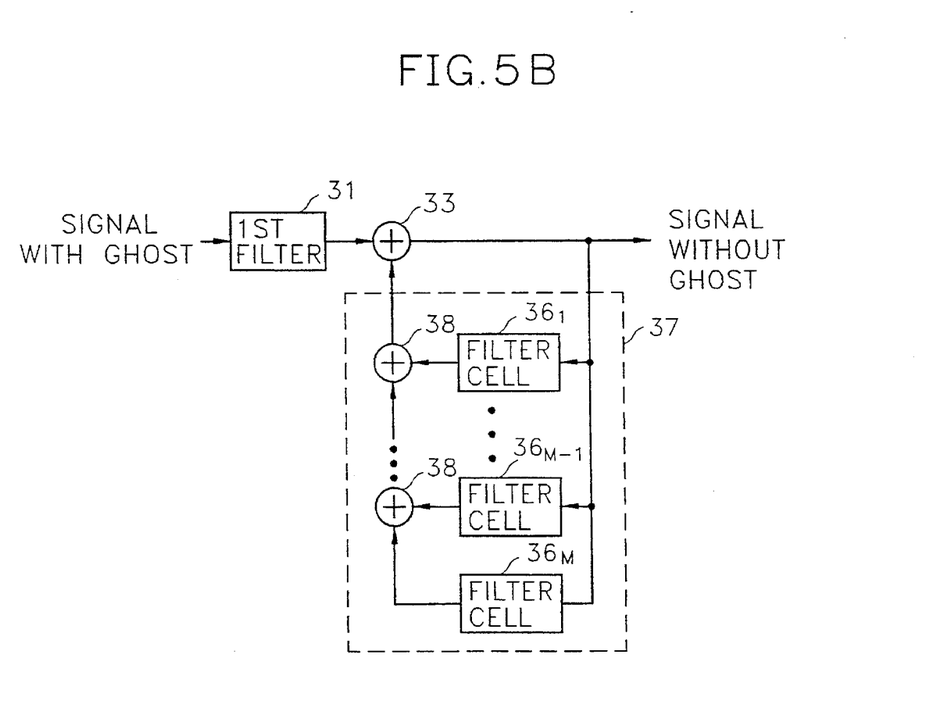

Coefficient and control signal generator 17 receives write window signal WE and detects a rising edge of write window signal WE. Coefficient and control signal generator 17 generates read reset signal RRST and read clock signal RCLK on the basis of the detected rising edge. The generated read reset signal RRST and read clock signal RCLK are used for reading the transmitted GCR signal stored in FIFO memory 16. Coefficient and control signal generator 17 reads the transmitted GCR signal from FIFO memory 16, and controls GCR ROM 18 to read a standard GCR signal in step 303. Then, coefficient and control signal generator 17 detects a characteristic of the transmission channel on the basis of a correlation between two GCR signals in step 305. When detecting the channel characteristic, coefficient and control signal generator 17 calculates time delay values of the ghost signals contained in the transmitted GCR signal with respect to the original video signal and generates a delay control signal DCTL on the basis of the calculated time delay values. Delay control signal DCTL is used for controlling a variable delay 41 described with reference to FIGS. 5 through 8.

When step 305 is completed, coefficient and control signal generator 17 calculates actual filter coefficients for reflecting an inverse characteristic of the detected channel characteristic of the ghost-containing video signal on the basis of the detected channel characteristic in step 307. As algorithms which can be used for calculation of the actual filter coefficients are a least mean square algorithm (LMS), a zero forcing algorithm, and a fast Fourier transform algorithm (FFT). On the other hand, the actual filter uses filter coefficients generally represented as 8 bits through 10 bits. For this reason, coefficient and control signal generator 17 quantizes the actual filter coefficients and then multiplies the quantized actual filter coefficients by a corresponding scaling factor S in step 309, respectively. The scaling factor S multiplied in step 309 is assigned to each ghost having a different size as described above. Coefficient and control signal generator 17 reads the CSD coefficient values corresponding to the multiplication result obtained in step 309 from coefficient store 20. Coefficient and control signal generator 17 uses the CSD coefficient values and performs a cancelling operation of cancelling the ghost components contained in the transmitted GCR signal, that is, the GCR signal supplied from FIFO memory 16, using the CSD coefficient values in step 311.

Coefficient and control signal generator 17 multiplies the ghost-cancelled transmitted GCR signal by the corresponding rescaling factor 1/S and compares the residual ghost remaining in the multiplication resultant signal with a predetermined threshold value in step 313. The threshold value used for comparison operation in step 313 can be established by considering a point that the CSD coefficient values are obtained on the basis of a value obtained by multiplying the actual filter coefficients by scaling factor S, respectively. In this case, the signal which is compared with the threshold value in step 313 is a filtered signal, that is, the ghost-cancelled signal using the CSD coefficient values. In step 313, if the residual ghost is not less than the threshold value in size, coefficient and control signal generator 17 increases scaling factor S by a predetermined width ΔS in step 315. Then, coefficient and control signal generator 17 performs steps 309, 311, 313 and 315 repetitively using a new scaling factor S+ΔS. Also, if the residual ghost is less than the threshold value in step 313, coefficient and control signal generator 17 supplies the CSD coefficient signal CSC representing the CSD coefficient values and rescaling factor RSF representing rescaling factor 1/S, which is the inverse of the scaling factor, to ghost canceler 15 in step 317.

Operation of the FIG. 2 apparatus when coefficient and control signal generator 17 operates according to the FIG. 4 flow-chart will be described below.

In this case, operation of the FIG. 2 apparatus from the start to step 405 in FIG. 4, when coefficient and control signal generator 17 operates, is the same as operation of the FIG. 2 apparatus from the start to step 305 in FIG. 3. When step 405 is performed, coefficient and control signal generator 17 calculates the actual filter coefficients and performs an operation for cancelling the ghost components contained in the transmitted GCR signal applied from FIFO memory 16 according to the calculated actual filter coefficients in step 407.

If the residual ghost is determined to be not smaller than a first threshold value in step 409, control flows to step 405 where coefficient and control signal generator 17 detects a new channel characteristic on the basis of correlation between the ghost-cancelled transmitted GCR signal and the standard GCR signal. Then, coefficient and control signal generator 17 performs an updating operation of the actual filter coefficients and the ghost cancelling operation in step 407, and in step 409 again compares the residual ghost with the first threshold value. If the residual ghost becomes smaller than the first threshold value by repeating the above processes, that is, if the optimum real-number type filter coefficient is calculated, coefficient and control signal generator 17 multiplies the optimum real-number type filter coefficient by a predetermined scaling factor S in step 411.

Coefficient and control signal generator 17 reads the CSD coefficient signal corresponding to the multiplication resultant values from coefficient store 20 and performs filtering of the transmitted GCR signal supplied from FIFO memory 16 in step 413. If the residual ghost remaining in the ghost-cancelled transmitted GCR signal obtained by processing in step 413 is determined to be not less than a second threshold value in step 415, coefficient and control signal generator 17 changes scaling factor S into scaling factor S+ΔS having an increase of a predetermined width ΔS in step 417, and repeats steps 411, 413, 415 and 417. If it is judged in step 415 that the residual ghost is smaller than the second threshold value, coefficient and control signal generator 17 outputs CSD coefficient signal CSC representing the CSD coefficient values and rescaling factor signal RSF representing rescaling factor signal 1/S to ghost canceler 15 in step 419.

Ghost canceler 15 performs a ghost cancelling operation on the basis of the delay control signal DCTL, the CSD coefficient signal and rescaling factor signal RSF which are output from coefficient and control signal generator 17 by the signal processing steps shown in FIGS. 3 and 4.

FIGS. 5A and 5B show two different filter arrangements constituting a ghost canceler 15 of FIG. 2. A first filter 31 of FIG. 5A or 5B receives a ghost-containing video signal from A/D converter 11, and cancels a preghost time-leading the original video signal, to perform a signal equalization operation. A second filter portion 35 of FIG. 5A and a third filter portion 37 of FIG. 5B receive the output of adder 33 and cancel a postghost time-lagging the original video signal. The second filter portion 35 and the third filter portion 37 each includes a plurality of filter cells $36_1, 36_2 \ldots 36_M$. As shown in FIG. 5A, filter cells $36_1, 36_2 \ldots 36_M$ constituting second filter portion 35 are arranged to sequentially receive the output of adder 33. On the other hand, as shown in FIG. 5B, filter cells $36_1, 36_2 \ldots 36_M$ constituting third filter portion 37 are arranged so as to cumulatively sum the output of filter cells $36_1, 36_2 \ldots 36_M$ via respective adders 38 and to supply the summed result to adder 33.

The filter cells $36_1, 36_2 \ldots 36_M$ constituting second filter portion 35 or third filter portion 37 are designed so that only a signal in a region having ghosts is filtered, with one filter cell used for cancelling one ghost. Thus, the number of filter cells M is determined by the number of the ghosts contained in the video signal. That is, the number M is determined according to a size of the ghost or a range occupied by the ghost.

Figure 7:
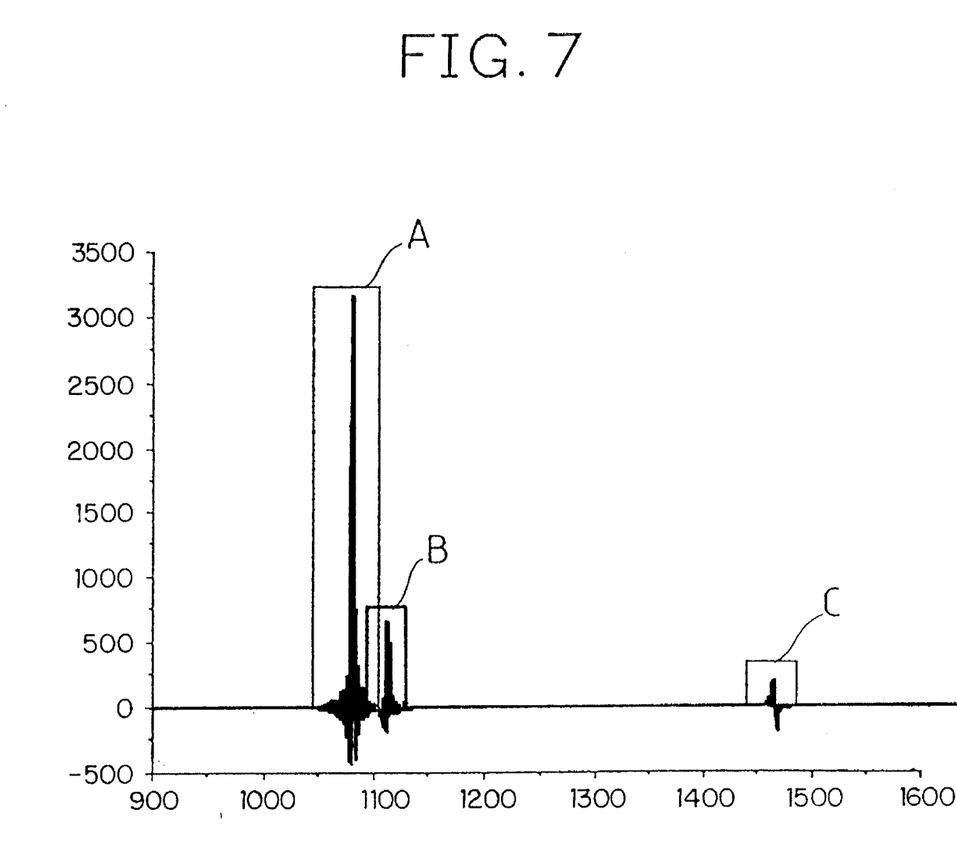
FIG. 7 is a graphical view indicating a channel characteristic of ghosted video signals.

FIG. 7 is a graphical view indicating a channel characteristic of a video signal with ghosts. In FIG. 7, portion "A" shows a filtering signal region using an initial filter cell $36_1$, portion "B" shows a filtering signal region using a second filter cell $36_2$, and portion "C" shows a filtering signal region using a third filter cell $36_3$. As described above, in order to filter the ghost-containing signal using a respectively different filter cell and CSD coefficient, a different scaling factor is assigned to a respective ghost. Therefore, the filter cell for processing a ghost having a wide region (such as a spread ghost) is formed of a plurality of CSD filters 42. The above-described first filter 31 can be also designed so that the video signal is filtered using a plurality of CSD filters 42. In this case, first filter portion 31 does not require a variable delay 41, and CSD filter 42 is designed having a large number of taps "N". A respectively detailed construction of filter cells $36_1, 36_2 \ldots 36_M$ included in second filter portion 35 or third filter portion 37 is shown in FIG. 6A or 6B.

Figure 6A:
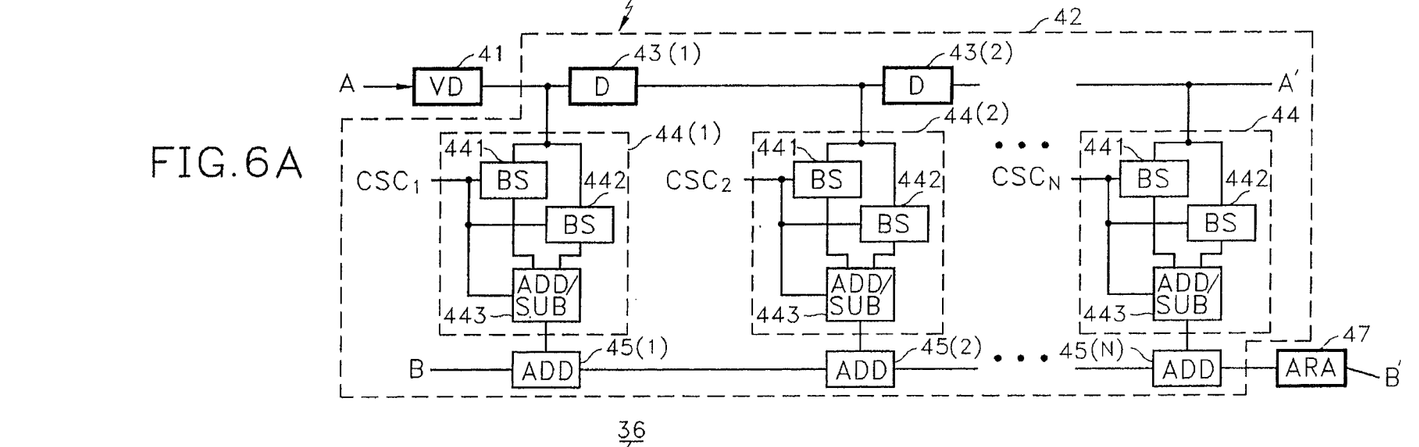
FIGS. 6A and 6B are block diagrams showing two different constructions of a filter cell of FIGS. 5A and 5B.
Figure 6B:
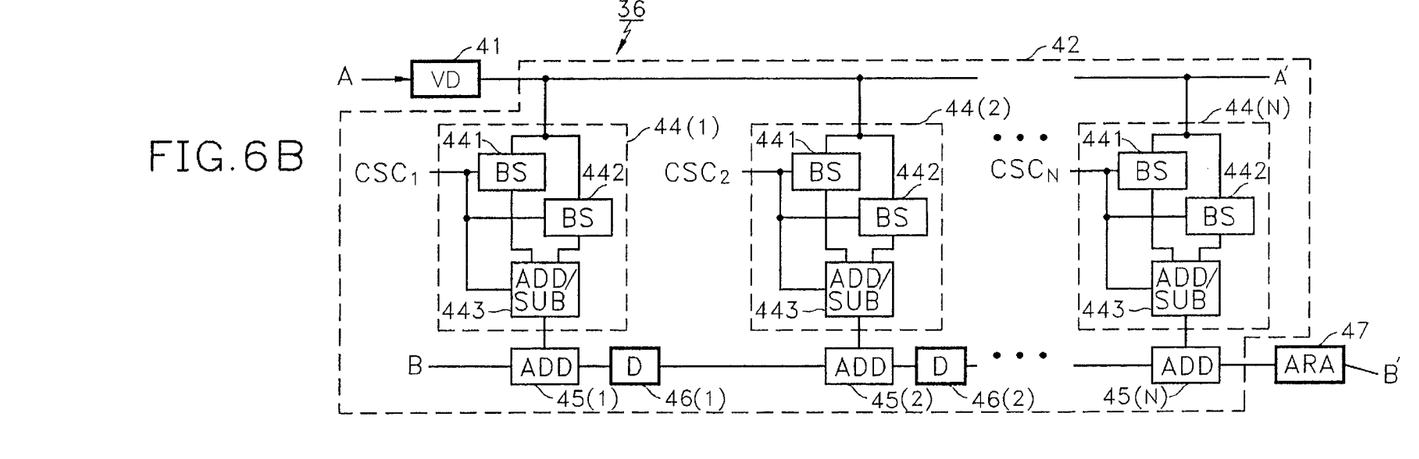

FIGS. 6A and 6B show two different constructions of a filter cell $36_1, 36_2 \ldots 36_M$ when L=2. A filter cell shown in FIG. 6A or 6B includes a variable delay 41, a CSD filter 42 having N taps and an adaptive rescaling amplifier 47. CSD filter 42 of FIG. 6A delays the output signal of variable delay 41, and CSD filter 42 of FIG. 6B delays the output signal of adders $45_1, 45_2 \ldots 45_N$.

Ghost canceler 15 uses the applied delay control signal DCTL and generates a delay value for delaying the ghost-containing video signal, to supply the delay values to corresponding variable delay 41. Variable delay 41 delays the input data according to the corresponding delay value obtained on the basis of delay control signal DCTL and outputs the delayed data. CSD filter 42 includes multipliers 44(1), 44(2) ... 44(N) for respectively receiving one of CSD coefficient values $CSC_1, CSC_2 \ldots CSC_N$, delays 43(1), 43(2) ... 43(N) for delaying the signals and adders 45(1), 45(2) ... 45(N).

Each multiplier includes barrel shifters 441 and 442 which receive the output signal of variable delay 41 or delay 43(1), 43(2) ... 43(N) and shift the received signal according to the value of the CSD coefficient, and adder/subtractor 443 for performing an addition or subtraction of the output data of barrel shifters 441 and 442. Each of multipliers 44(1), 44(2) ... 44(N) processes the ghost-containing video signal according to the different CSD coefficient value. Such a multiplier performs a multiplication operation based on CSD coefficient signal CSC applied from coefficient and control signal generator 17. To perform such a multiplication operation, barrel shifters 441 and 442 shift the stored data according to the CSD coefficient value and adder/subtractor 443 performs an addition or subtraction operation of the output data of barrel shifters 441 and 442 according to the non-zero digit of the CSD coefficient.

In more detail, when multiplier 44(1) receives ghost-containing video data from variable delay 41 or delay 43(1), 43(2) ... 43(N-1), barrel shifter 441 shifts the input video data by (place value −1) of one non-zero digit within the CSD coefficient, and barrel shifter 442 shifts the input video data by (place value −1) of the other non-zero digit within the CSD coefficient. Adder/subtractor 443 adds or subtracts the two output data from barrel shifters 441 and 442 according to the non-zero digit within the CSD coefficient. That is, if the non-zero digit is −1, adder/subtractor 443 adds 2-complement of the output data from barrel shifter 441 (or 442) and the output data from other the barrel shifter 442 (or 441). When filter cells $36_1, 36_2 \ldots 36_M$ are arranged as shown in FIG. 5A, the output of adder 33 is input to variable delay 41 in filter cell $36_1$, and the data which is not processed by multipliers 44(1), 44(2) ... 44(N) in filter cell $36_1$ is supplied to variable delay 41 in filter cell $36_2$. The output data of adaptive rescaling amplifier 47 in filter cell $36_1$ is applied to first adder 45(1) in filter cell $36_2$, and the output data of adaptive rescaling amplifier 47 in filter cell $36_M$ is applied to adder 33. First adder 45(1) in filter cell $36_1$ adds "0" to the output data of multiplier 44(1) and outputs the added result. When filter cells $36_1, 36_2$ $36_M$ are arranged as shown in FIG. 5B, variable delay 41 in each filter cell receives the output data of adder 33. First adder 45(1) adds "0" to the output data of multiplier 44(1) and outputs the added result. Then, adaptive rescaling factor amplifier 47 outputs data to a succeeding adder 38.

Adaptive rescaling amplifier 47 amplifies the input data according to rescaling factor 1/S obtained from rescaling factor signal RSF and outputs the amplified result. Adaptive rescaling amplifier 47 is limited by the maximum value of the scaling factor and the width between the scaling factors in its hardware construction. Decreasing the width between the scaling factors allows more optimum CSD coefficients to be obtained. However, this requires more calculation and complicates the hardware of adaptive rescaling amplifier 47. As a method of reducing the complexity of the hardware, the output data of adders 45(1), 45(2) ... 45(N) can be shifted according to the rescaling factor value. Accordingly, adaptive rescaling amplifier 47 can be simply implemented using shift registers. In such a case, a shifting operation is accomplished between digit values corresponding to decimal numbers 0.25, 0.5, 1, 2, 4, 8, 16 and 32.

When the real-number type filter coefficient is converted into the CSD coefficient by adaptive rescaling amplifier 47, scaling factor S being an inserted gain is eradicated. Thus, a quantization error generated in the conversion of the filter coefficient represented as the real number into the CSD coefficient can be reduced.

The ghost-cancelled video signal output from ghost canceler 15 is output to D/A converter 21 and multiplexer 14. Coefficient and control signal generator 17 controls multiplexer 14 so that the video signal supplied from ghost canceler 15 to multiplexer 14 is supplied to FIFO memory 16. Then, coefficient and control signal generator 17 continuously checks whether the characteristic of the transmission channel is varied on the basis of the correlation between the ghost-cancelled transmitted GCR signal stored in FIFO memory 16 and the standard GCR signal stored in GCR ROM 18. If the characteristic of the transmission channel is not varied, coefficient and control signal generator 17 repetitively performs such an operation to check the state of the channel. In this case, CSD coefficient signal CSC and rescaling factor signal RSF, both of which are supplied to ghost canceler 15, are produced according to the FIGS. 3 and 4 flowcharts.

When the characteristic of the transmission channel is varied, coefficient and control signal generator 17 controls multiplexer 14 so that the signal supplied from A/D converter 11 is supplied to FIFO memory 16, and newly generates CSD coefficient signal CSC and rescaling factor signal RSF according to the flow-charts of FIGS. 3 and 4. Then, ghost canceler 15 performs a ghost cancelling operation according to newly generated CSD coefficient signal CSC and rescaling factor signal RSF.

In case of the standard NTSC signal, the signals processed in A/D converter 11, D/A converter 21, the filter cells of ghost canceler 15, write window signal WE, and the write operation-related signal of FIFO memory 16 use a clock frequency of $4f_{sc}$ in which $f_{sc}$ indicates a color subcarrier frequency. Coefficient and control signal generator 17, GCR ROM 18 and RAM 19 use a clock pulse of a different frequency. The reason is that the system clock frequency of coefficient and control signal generator 17 is generally smaller than $4f_{sc}$. The GCR signal interval contained in the video signal output from A/D converter 11 leads the GCR signal interval contained in the video signal output from ghost canceler 15 in time, due to the time delay of the filters in ghost canceler 15. Thus, coefficient and control signal generator 17 re-adjusts the control signals of FIFO memory 16 so that the GCR signal in the video signal output from A/D converter 11 can be exactly detected when the channel characteristic of the video signal is varied.

To summarize, ghost canceler 15 uses the CSD coefficients generated in coefficient and control signal generator 17 and rescaling factor 1/S to cancel the ghosts. Coefficient and control signal generator 17 checks whether the channel characteristic is varied on the basis of the read transmitted GCR signal. When the channel characteristic is varied, coefficient and control signal generator 17 continuously calculates the new CSD coefficients and rescaling factor 1/S during the performance of the ghost-cancelling operation of the FIG. 2 apparatus.

In the above-described embodiment, the CSD coefficient has been determined on the basis of the comparison of the residual ghost and the threshold value. However, it is possible to determine the CSD coefficient using the optimum scaling factor in which the residual ghost reaches a minimum within a predetermined range of the scaling factor.

The ghost cancelling apparatus according to the present invention when L=2 and M=8 indicates a similar ghost-cancellation performance to that using an 8-bit real-number type filter coefficient. The larger the value of M becomes, the better ghost-cancellation performance can be obtained.

The above-described ghost cancelling apparatus uses a canonical signed digit as a filter coefficient to cancel a ghost from a video signal. Accordingly, although the ghost cancelling apparatus of the present invention uses multipliers having a smaller capacity than the existing ghost canceler which uses an unmodified filter coefficient, the ghost cancelling apparatus of the present invention can obtain a ghost cancelling performance equal to or very similar to the existing one. In the present invention, a particular filtering process is performed for each ghost by corresponding the scaling factor to the ghost, thereby optimally filtering each ghost. The present invention can be utilized in a system having a training sequence such as an 8-level vestigial sideband transmission system in the grand alliance high-definition television system.

While only certain embodiments of the invention have been specifically described herein, it will be apparent that numerous modifications may be made thereto without departing from the spirit and scope of the invention.

What is claimed is:

1. A ghost cancelling apparatus comprising:

an input end for receiving a ghost-containing video signal;

means for separating a transmitted ghost cancelling reference (GCR) signal from the video signal received via said input end, and storing the separated transmitted GCR signal therein;

control means for receiving the transmitted GCR signal stored in said separating and storing means to detect a characteristic of a channel through which the video signal is transmitted, and generating canonical signed digit (CSD) filter coefficient values represented in the form of CSD codes on the basis of the detected channel characteristic; and filter means for cancelling a ghost component contained in the video signal received via said input end on the basis of the CSD filter coefficient values generated by said control means, and outputting a ghost-cancelled video signal.

2. The ghost cancelling apparatus according to claim 1, wherein said control means uses a predetermined scaling factor to convert actual filter coefficient values according to the detected channel characteristic into the CSD filter coefficient values represented as the CSD codes.

3. The ghost cancelling apparatus according to claim 2, wherein said control means comprises:

a first memory for storing a standard GCR signal;

a coefficient store for storing a plurality of the CSD filter coefficient values; and a filter controller for receiving the transmitted GCR signal stored in said separating and storing means and the standard GCR signal stored in said first memory, detecting the characteristic of the channel through which the video signal is transmitted, reading the CSD filter coefficient values corresponding to respective filter coefficient values according to the detected channel characteristic from said coefficient store, and outputting a CSD coefficient signal representing the read CSD filter coefficient values.

4. The ghost cancelling apparatus according to claim 3, wherein said filter controller reads the CSD filter coefficient values having a most approximate value with respect to values obtained by multiplying respective filter coefficient values according to the detected channel characteristic by the predetermined scaling factor, from said coefficient store.

5. The ghost cancelling apparatus according to claim 2, wherein said filter means comprises a plurality of CSD filters for filtering the video signal according to the CSD filter coefficient values generated by said control means, and wherein each of said plurality of COD filters comprises a plurality of multipliers for performing a shifting operation and an addition operation of a respective one of the CSD filter coefficient values with respect to the ghost containing video signal according to each digit of an applied CSD filter coefficient value or an addition operation of a complement of "2" respectively.

6. The ghost cancelling apparatus according to claim 5, wherein each of said multipliers, in case that the CSD filter coefficient values have two non-zero digits, comprises:

a first barrel shifter for shifting the data of the ghost containing video signal by (place value −1) of one non-zero digit within the CSD filter coefficient value;

a second barrel shifter for shifting the data of the ghost containing video signal by (place value-1) of the other non-zero digit within the CSD filter coefficient value; and an adder/subtractor for adding data output from said first and second barrel shifters if the non-zero digit within said CSD filter coefficient values is "1" and subtracting the two output data if a non-zero digit is "−1".

7. The ghost cancelling apparatus according to claim 5, wherein said filter means further comprises a variable delay coupled to an input end of one of the plurality of CSD filters for delaying the ghost containing video signal by an applied time delay value and supplying the delayed signal to the CSD filters, and wherein said control means further comprises a means for calculating a time delay value of a ghost signal contained in the transmitted GCR signal with respect to the video signal and supplying the calculated time delay value to the corresponding CSD filter.

8. The ghost cancelling apparatus according to claim 5, wherein said filter means further comprises a rescaling amplifier associated with each of said plurality of CSD filters for multiplying a signal output from said each CSD filter by a rescaling factor value which is an inverse of the predetermined scaling factor, and wherein said control means applies the rescaling factor value corresponding to said each CSD filter to the corresponding rescaling amplifier.

9. The ghost cancelling apparatus according to claim 8, wherein said rescaling amplifier comprises a shifter for shifting the signal output from the corresponding CSD filter according to the applied rescaling factor value and outputting the shifted result.

10. The ghost cancelling apparatus according to claim 1, further comprising a multiplexer for receiving the video signal received via said input end and the ghost-cancelled video signal output from said filter means and supplying both the video signal received via said input end and the ghost cancelled video signal output from said filter means to said separating and storing means, and wherein said control means controls said multiplexer so that the ghost-containing video signal received via said input end is applied to said separating and storing means when a previously detected channel characteristic is varied.

11. A ghost cancelling method for cancelling a ghost-containing received video signal, said ghost cancelling method comprising the steps of:

(a) storing canonical signed digit (CSD) filter coefficient values represented as CSD codes in correspondence to respective actual filter coefficient values, and a standard ghost cancelling reference (GCR) signal;

(b) separating a transmitted GCR signal from the ghost-containing received video signal and storing the separated transmitted GCR signal;

(c) reading the stored transmitted GCR signal and the stored standard GCR signal;

(d) using the two GCR signals read in said step (c) to detect a characteristic of a channel through which the ghost-containing received video signal is transmitted, and performing a ghost cancelling operation with respect to the transmitted GCR signal according to the detected channel characteristic, to thereby determine optimum CSD filter coefficient values with respect to the detected channel characteristic; and (e) performing the ghost cancelling operation with respect to the ghost-containing received video signal on the basis of the determined optimum CSD filter coefficient values.

12. The ghost cancelling method according to claim 11, wherein said step (d) comprises the substeps of:

(d1) detecting the characteristic of a transmission channel on the basis of the transmitted GCR signal and the standard GCR signal;

(d2) calculating the actual filter coefficient values according to the detected characteristic of the transmission channel;

(d3) cancelling the ghost contained in the transmitted GCR signal read in said step (c), by using the CSD filter coefficient values corresponding to a result of multiplication of the actual filter coefficient values by a predetermined scaling factor value; and (d4) varying said predetermined scaling factor value, and repeatedly performing the ghost cancelling operation with respect to the ghost-cancelled transmitted GCR signal, on the basis of the actual filter coefficient values obtained according to a correlation between the ghost-cancelled transmitted GCR signal and the standard GCR signal and the CSD coefficient values according to the scaling factor of which the value is varied, until a residual ghost value remaining in the transmitted GCR signal which is ghost-cancelled by said sub-step (d3) becomes smaller than, a predetermined first value.

13. The ghost cancelling method according to claim 12, further comprising the sub-steps of:

(da1) cancelling the ghost contained in the transmitted GCR signal which is read in said step (c) using the actual filter coefficient values calculated in said sub-step (d2); and (da2) repeatedly performing the ghost cancelling operation with respect to the ghost-cancelled transmitted GCR signal, using the actual filter coefficient values obtained on the basis of a correlation between the transmitted GCR signal which is ghost-cancelled in said sub-step (da1) and the standard GCR signal, until the residual ghost value remaining in the transmitted GCR signal which is ghost-cancelled by said sub-step (da1) becomes smaller than a predetermined second value.

14. The ghost cancelling method according to claim 11, wherein said step (e) comprises the sub-step of performing a shifting, shifting and addition, and shifting and addition of 2-complement with respect to data of said ghost-containing received video signal, respectively, according to each digit of an optimum CSD filter coefficient value.

15. The ghost cancelling method according to claim 11, further comprising the steps of:

(f) detecting the characteristic of a transmission channel for every transmitted GCR signal contained in the video signal;

(g) judging whether the characteristic of the detected transmission channel is changed; and (h) repeating said steps (d) through (h) following said step (c) if a judgment is made in said step (g) that the characteristic of the transmission channel is changed.

* * * * *